D. Checkeni.
Toy.
Nº 76892.  Patented Apr. 21, 1868.
Fig. 1.
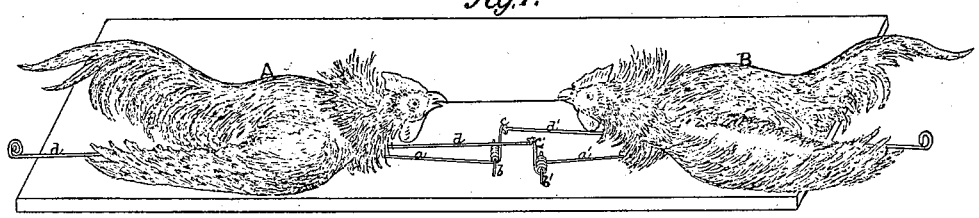
Fig. 2.
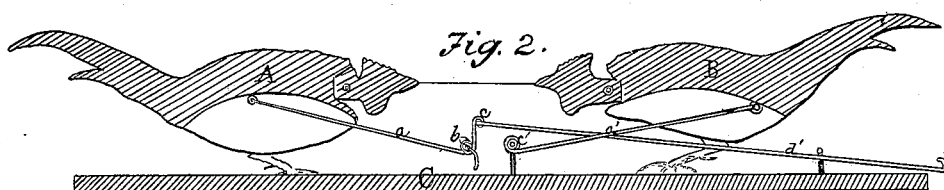
Fig. 3.
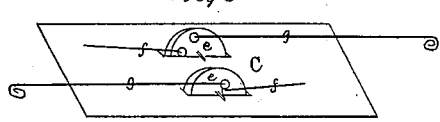
Fig. 4.
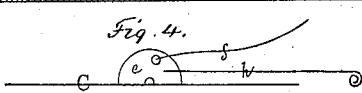
Fig. 5.
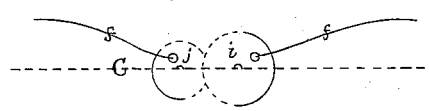
Fig. 6.
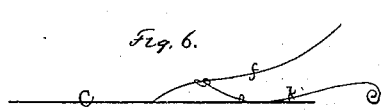
Fig. 7.
Fig. 8.
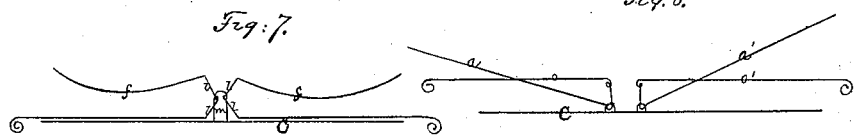
WITNESSES
INVENTOR

United States Patent Office.

DOMINICO CHECKENI, OF NEW YORK, N. Y., ASSIGNOR TO HIMSELF, JOHN W. BOTELER, AND CHARLES K. SHERWOOD, OF WASHINGTON, DISTRICT OF COLUMBIA.

Letters Patent No. 76,892, dated April 21, 1868.

TOY.

The Schedule referred to in these Letters Patent and making part of the same.

TO ALL WHOM IT MAY CONCERN:

Be it known that I, DOMINICO CHECKENI, of the city of New York, in the county and State of New York, have invented an Improved Toy; and I do hereby declare that the following is a full, clear, and exact description of the same, reference being had to the annexed drawings, forming part of this specification, in which—

Figure 1 is a perspective view of my invention.

Figure 2 is a longitudinal vertical section thereof, taken on the plane of a line drawn horizontally through the centre of fig. 1.

Figures 3, 4, 5, 6, 7, and 8, in red outline, represent modifications of my invention.

My invention consists in combining two fighting birds or animals in such manner that by operating wires, cords, wheels, or an equivalent for either, the two birds or other animals will be caused to come together, as in the act of fighting peculiar to the species of bird or animal represented.

In figs. 1 and 2 of the accompanying drawings, I have represented two cocks, A B, couched on a platform, C, which may be strewed with moss and grass, in representation of nature. The said cocks are made of wood, or any other suitable material, and may be covered with feathers or down, or otherwise made to resemble the species of fowl they are intended to imitate. Pivoted to the breasts of the fowls there are wire rods $a\ a'$, which carry a coil at one end, which is placed on staples $b\ b'$, the ends being bent upward and turned over to form eyes $c\ c'$. Into these eyes are hooked draw-rods $d\ d'$, which pass through staples near the outer end of the platform, the rod $d$ hooking into the eye $c'$, and the rod $d'$ hooking into the eye $c$; hence, if the rod $d$ be drawn outward, the fowl B will be caused to rise and jump forward, as in the act of fighting, and if the rod $d'$ be drawn outward, the fowl A will be caused to act in like manner, and by pulling the rods simultaneously, both birds will be caused to spring at and come in contact with each other, as in fighting. I will here remark that the rods, instead of being fastened to the eye of the rod which operates the opposite bird, can be attached, as shown in fig. 8, to the eye on the wire which operates the nearest bird, but in this case the rods lettered $o$, as in fig. 8, would be pushed instead of pulled, in order to make the birds fight.

The heads of the birds are pivoted to their necks, so that the said heads can move in a manner to counterfeit nature, and the birds are connected by a horse-hair, or fine cord, or an equivalent therefor, running from the bill of the one to the bill of the other. By thus connecting the heads of the birds, if the one bird be raised he will tip his head, as if watching the other bird, whilst the latter bird will raise his head, as if cautiously watching his assailant. This connection between the birds or other animals may be made at other points of the bodies of the same, if desirable, and it probably would be desirable when other kinds of animals are substituted for the cocks.

The mechanism above described for causing the cocks to spring at each other, to represent the act of fighting, is of a very simple character, and I do not limit myself to such means only for effecting the combination desired, and as equivalents therefor I have shown in red, in fig. 3, two wheels, $e\ e$, axled at or near the centre of the platform, to each of which is connected a wire or rod, $f$, which supports the cock, and a wire or cord, $g$, for operating the wheels. It will be seen that by drawing upon the rods or cords $g$, the wheels will turn so as to cause the birds to spring at each other, and otherwise imitate fighting.

In fig. 4, the same arrangement is illustrated, except that a push-rod, $h$, is employed instead of a draw-rod, and thus the bird at that end of the platform where the rod is pushed will be operated.

In fig. 5, I have shown a driving-wheel, $i$, extending below the platform, and another wheel, $j$, operated by it, either by friction or cogs upon both, (the latter being shown,) and thus, by moving the platform, the driving-wheel $i$ will operate both birds which are mounted on the supporting-rods $f$.

In fig. 6, I have shown the supporting-rod $f$ with its lower end fastened to the platform C, and a lever, $k$, is so arranged that its inner end can be tilted up by pressing down on the outer end, which will cause the birds to operate as desired.

In fig. 7, I have shown a system of levers for operating the birds. Two bent levers, $l$, are pivoted in a block, $m$, and provided at respective ends with draw-rods $n$, and supporting-rods $f$. By pulling on these rods $n$, the birds are caused to operate as required.

I will here remark that cross-levers may be employed and operated by push-rods; I do not, therefore, limit myself to the manner herein shown of arranging the levers.

It is obvious that all the above modifications effect the same end, namely, that of causing the cocks to imitate, in all their motions, the act of fighting peculiar to such fowls.

I do not limit myself to any precise mechanism herein shown for effecting the object sought, my invention being to combine the two fowls or other animals by rods, cords, wheels, or an equivalent therefor, in such manner as to cause such birds or animals to imitate the motions peculiar to such birds or animals when fighting.

What I claim as my invention, and desire to secure by Letters Patent, is—

1. Combining two cocks or other animals by rods, cords, wheels, or an equivalent therefor, in such manner that by operating the said rods, cords, or wheels, the said cocks or other animals will be caused to imitate the motions peculiar to such animals when fighting, substantially as herein shown and described.

2. Connecting the heads or bodies of the birds or other animals together, by means of a horse-hair, or an equivalent therefor, running from one to the other, substantially as and for the purposes herein specified.

DOMINICO CHECKENI.

Witnesses:
EMMA CHECKENI,
M. M. LIVINGSTON.